United States Patent
Takahashi

(10) Patent No.: US 9,692,931 B2
(45) Date of Patent: Jun. 27, 2017

(54) IMAGE PROCESSING APPARATUS AND IMAGE PROCESSING APPARATUS CONTROL METHOD

(75) Inventor: Yasuhiro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 13/279,995

(22) Filed: Oct. 24, 2011

(65) Prior Publication Data
US 2012/0099154 A1  Apr. 26, 2012

(30) Foreign Application Priority Data
Oct. 25, 2010 (JP) ................................ 2010-238690

(51) Int. Cl.
| G06F 3/12 | (2006.01) |
| G06F 15/00 | (2006.01) |
| G06K 1/00 | (2006.01) |
| H04N 1/23 | (2006.01) |
| H04N 1/32 | (2006.01) |
| H04N 1/00 | (2006.01) |

(52) U.S. Cl.
CPC ..... *H04N 1/32112* (2013.01); *H04N 1/00222* (2013.01); *H04N 2201/0094* (2013.01); *H04N 2201/3202* (2013.01); *H04N 2201/3205* (2013.01); *H04N 2201/3214* (2013.01); *H04N 2201/3215* (2013.01); *H04N 2201/3216* (2013.01); *H04N 2201/3226* (2013.01); *H04N 2201/3274* (2013.01)

(58) Field of Classification Search
CPC .... G06K 15/02; G06F 17/243; G06F 21/6227
USPC .............................. 358/448, 474, 1.14, 1.2
See application file for complete search history.

(56) References Cited

U.S. PATENT DOCUMENTS

| 5,125,045 | A * | 6/1992 | Murakami ......... G06T 3140 35 |
| 6,459,823 | B2 * | 10/2002 | Altunbasak et al. ......... 382/299 |
| 6,975,434 | B1 * | 12/2005 | Pilu ...................... H04N 1/0402 358/450 |
| 8,107,099 | B2 * | 1/2012 | Loce et al. .................... 358/1.14 |
| 8,355,147 | B2 * | 1/2013 | Ferlitsch ............ H04N 1/32128 358/1.1 |
| 8,358,431 | B2 * | 1/2013 | Salvestro ...................... 358/1.18 |
| 8,508,769 | B2 * | 8/2013 | Matsuzawa .............. G06F 3/121 358/1.14 |
| 2003/0184805 | A1 * | 10/2003 | Kurokawa ............. G06K 15/02 358/1.18 |
| 2006/0109498 | A1 * | 5/2006 | Ferlitsch ............ H04N 1/32128 358/1.15 |
| 2006/0279764 | A1 * | 12/2006 | Shimada ............... G06F 21/608 358/1.14 |
| 2008/0165382 | A1 * | 7/2008 | Ferlitsch .............. H04N 1/3871 358/1.15 |

(Continued)

FOREIGN PATENT DOCUMENTS

| CN | 1893526 A | 1/2007 |
| EP | 2224722 A2 | 9/2010 |

(Continued)

Primary Examiner — Akwasi M Sarpong
(74) Attorney, Agent, or Firm — Canon U.S.A. Inc., IP Division

(57) ABSTRACT

In executing a job for combining a plurality of images and outputting the combined image, an information processing apparatus stores log information to allow a system administrator to later identify what image has been output while effectively saving the capacity of a storage device to be used.

7 Claims, 16 Drawing Sheets

| JOB TYPE (7001) | JOB TYPE (7002) | RECORDING OF ACTUAL IMAGE (7003) |
|---|---|---|
| COPY JOB (7101) | INPUT JOB (7102) | YES (7103) |
| PDL-PRINT JOB (7201) | INPUT JOB (7202) | YES (7203) |
| SCAN JOB/BOX STORAGE JOB (7301) | INPUT JOB (7302) | YES (7303) |
| RECEIVING JOB (FAX/I-FAX) (7401) | INPUT JOB (7402) | YES (7403) |
| TRANSMISSION JOB (FAX/I-FAX/SEND) (7501) | OUTPUT JOB (7502) | NO (7503) |
| BOX-PRINT JOB, RECEIVING PRINT JOB (7601) | OUTPUT JOB (7602) | NO (7603) |
| FORM REGISTRATION JOB (7701) | INPUT JOB (7702) | YES (7703) |

(56) References Cited

U.S. PATENT DOCUMENTS

| | | | | |
|---|---|---|---|---|
| 2009/0109479 A1* | 4/2009 | Kato | ................... | G06F 17/243 |
| | | | | 358/1.15 |
| 2010/0033754 A1* | 2/2010 | Okita | ................... | G06F 3/1208 |
| | | | | 358/1.15 |

FOREIGN PATENT DOCUMENTS

| JP | 2006-237787 A | 9/2006 |
|---|---|---|
| JP | 2006-330939 A | 12/2006 |
| JP | 2007-006480 A | 1/2007 |
| JP | 2007-316820 A | 12/2007 |
| WO | 2007/023721 A1 | 3/2007 |

* cited by examiner

FIG.4

| JOB TYPE (7001) | JOB TYPE (7002) | RECORDING OF ACTUAL IMAGE (7003) |
|---|---|---|
| COPY JOB (7101) | INPUT JOB (7102) | YES (7103) |
| PDL-PRINT JOB (7201) | INPUT JOB (7202) | YES (7203) |
| SCAN JOB/BOX STORAGE JOB (7301) | INPUT JOB (7302) | YES (7303) |
| RECEIVING JOB (FAX/I-FAX) (7401) | INPUT JOB (7402) | YES (7403) |
| TRANSMISSION JOB (FAX/I-FAX/SEND) (7501) | OUTPUT JOB (7502) | NO (7503) |
| BOX-PRINT JOB, RECEIVING PRINT JOB (7601) | OUTPUT JOB (7602) | NO (7603) |
| FORM REGISTRATION JOB (7701) | INPUT JOB (7702) | YES (7703) |

FIG.5A

301 FIRST SHEET OF SCAN DOCUMENT

| IMAGE ATTRIBUTE (302) | |
|---|---|
| ImageType (303) | JPEG (304) |
| Resolution (305) | X=600,Y=600 (0306) |
| ImageSize (307) | X=4960,Y=7040 (0308) |

309 SECOND SHEET OF SCAN DOCUMENT

| IMAGE ATTRIBUTE (310) | |
|---|---|
| ImageType | JPEG |
| Resolution | X=600,Y=600 |
| ImageSize | X=4960,Y=7040 |

311 THIRD SHEET OF SCAN DOCUMENT

| IMAGE ATTRIBUTE (312) | |
|---|---|
| ImageType | JPEG |
| Resolution | X=600,Y=600 |
| ImageSize | X=4960,Y=7040 |

FIG.5B

| JOB LOG (313) | |
|---|---|
| JobKind (314) | COPY (315) |
| UserID (316) | 0123456789 (317) |
| StartTime (318) | 06/22/2010 10:05:40 (319) |
| EndTime (320) | 06/22/2010 10:06:05 (321) |
| Result (322) | OK (323) |
| PaperCount (324) | 3 (325) |
| Copies (326) | 2 (327) |
| DocumentID 1 (328) | 00000001 (329) |
| DocumentLog 1 (330) | YES (331) |

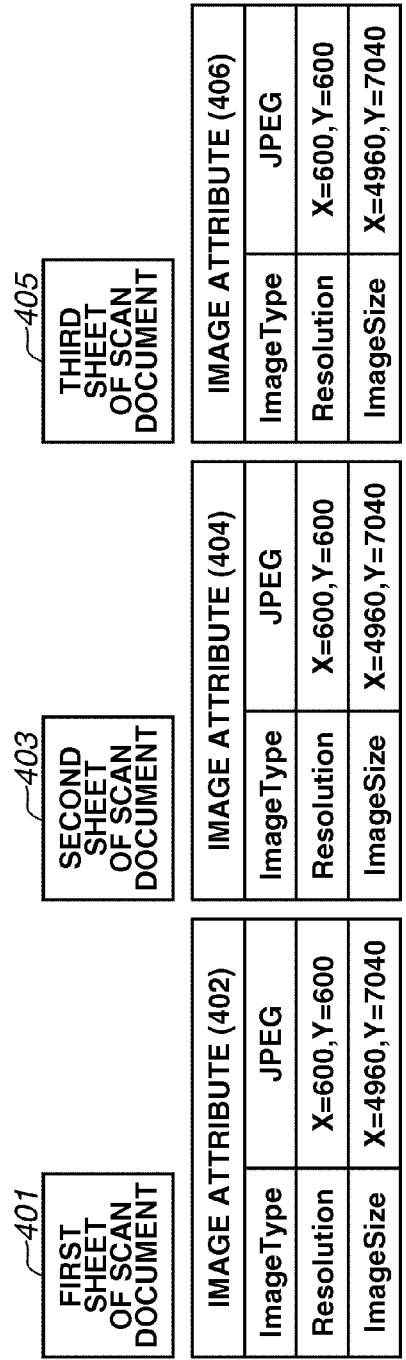

FIG.7

| JOB LOG (501) ||
|---|---|
| JobKind (502) | BoxPrint (503) |
| UserID | 0123456789 |
| StartTime | 06/22/2010 12:35:30 |
| EndTime | 06/22/2010 12:35:55 |
| Result | OK |
| PaperCount (504) | 3 (505) |
| Copies (506) | 2 (507) |
| DocumentID 1 (508) | 00000002 (509) |
| DocumentLog 1 (510) | NO (511) |

| IMAGE ATTRIBUTE (702) | |
|---|---|
| ImageType | JPEG |
| Resolution | X=600,Y=600 |
| ImageSize | X=4960,Y=7040 |

| JOB LOG (703) | |
|---|---|
| JobKind (704) | REGISTRATION OF FORM (705) |
| UserID | 0123456789 |
| StartTime | 06/22/2010 10:25:10 |
| EndTime | 06/22/2010 10:25:15 |
| Result | OK |
| PaperCount | 1 |
| Copies | — |
| DocumentID 1 (706) | 00000003 (707) |
| DocumentLog 1 | YES |

| JOB LOG (803) ||
|---|---|
| JobKind (804) | COPY (805) |
| UserID | 0123456789 |
| StartTime | 06/22/2010 10:30:20 |
| EndTime | 06/22/2010 10:30:35 |
| Result | OK |
| PaperCount | 1 |
| Copies | 1 |
| DocumentID 1 (806) | 00000003 (807) |
| DocumentLog 1 (808) | NO (809) |
| DocumentID 2 (810) | 00000004 (811) |
| DocumentLog 2 (812) | YES (813) |

| FORM DOCUMENT 2 (901) | IMAGE ATTRIBUTE (902) ||
|---|---|---|
| | ImageType | JPEG |
| | Resolution | X=600,Y=600 |
| | ImageSize | X=4960,Y=7040 |

| JOB LOG (903) ||
|---|---|
| JobKind (904) | REGISTRATION OF FORM (905) |
| UserID | 0123456789 |
| StartTime | 06/22/2010 10:45:10 |
| EndTime | 06/22/2010 10:45:15 |
| Result | OK |
| PaperCount | 1 |
| Copies | — |
| DocumentID 1 (906) | 00000005 (907) |
| DocumentLog 1 | YES |

FIRST SHEET OF SCAN DOCUMENT

| IMAGE ATTRIBUTE (1002) ||
|---|---|
| ImageType | JPEG |
| Resolution | X=600,Y=600 |
| ImageSize | X=4960,Y=7040 |

1003

SECOND SHEET OF SCAN DOCUMENT

| IMAGE ATTRIBUTE (1004) ||
|---|---|
| ImageType | JPEG |
| Resolution | X=600,Y=600 |
| ImageSize | X=4960,Y=7040 |

FIG.13B

| JOB LOG (1005) ||
|---|---|
| JobKind (1006) | COPY (1007) |
| UserID | 0123456789 |
| StartTime | 06/22/2010 10:55:20 |
| EndTime | 06/22/2010 10:55:40 |
| Result | OK |
| PaperCount | 2 |
| Copies | 1 |
| DocumentID 1 (1008) | 00000003 (1009) |
| DocumentLog 1 (1010) | NO (1011) |
| DocumentID 2 (1012) | 00000005 (1013) |
| DocumentLog 2 (1014) | NO (1015) |
| DocumentID 3 (1016) | 00000006 (1017) |
| DocumentLog 3 (1018) | YES (1019) |

FIG.15

| JOB LOG (1109) ||
|---|---|
| JobKind | COPY |
| UserID | 0123456789 |
| StartTime | 06/22/2010 11:00:20 |
| EndTime | 06/22/2010 11:00:50 |
| Result | OK |
| PaperCount | 4 |
| Copies | 1 |
| DocumentID 1 (1110) | 00000003 (1111) |
| DocumentLog 1 | NO |
| PageNo 1 (1112) | 1/3 (1113) |
| DocumentID 2 (1114) | 00000005 (1115) |
| DocumentLog 2 | NO |
| PageNo 2 (1116) | 2/4 (1117) |
| DocumentID 3 (1118) | 00000006 (1119) |
| DocumentLog 3 | YES |

IMAGE PROCESSING APPARATUS AND IMAGE PROCESSING APPARATUS CONTROL METHOD

BACKGROUND OF THE INVENTION

Field of the Invention

The present invention relates to an image processing apparatus and an image processing apparatus control method.

Description of the Related Art

A conventional image processing apparatus, such as a multifunction peripheral (MFP), executes a copy job for copying image data and a send job for transmitting the image data. Some of the image processing apparatuses, in executing the copy job and the send job, stores the date and time of execution of the job, a user ID of a user who has executed the job, and an image output by executing the job as log information.

By using the stored log information, an operator of the image processing apparatus can later identify who has output what image. As a result, a possible leakage or disclosure of the image output by executing the job can be effectively prevented.

Another conventional image processing apparatus, in executing an input job for inputting image data, stores image data and history information (the date and time of execution of the job and the user ID of the user who has executed the job) as log information. In executing an output job, another conventional image processing apparatus stores the history information and reference information, which is information for referring to image data, instead of storing the image data.

Japanese Patent Application Laid-Open No. 2006-330939 discusses a method in which in executing an output job, image data itself is not stored to prevent a redundant storage of image data, which may otherwise occur if the image data is stored when an input job is executed and when an output job is executed. As a result, the conventional method can save the capacity of a storage device to be used.

However, in combining an input image with an image previously registered to the conventional image processing apparatus, the conventional image processing apparatus does not store log information for later identifying the output image while saving the required capacity of the storage device to be used.

SUMMARY OF THE INVENTION

According to an aspect of the present invention, an An image processing apparatus includes an input unit configured to input a first image, a memory unit configured to store a second image, a combination unit configured to combine the first image, which is input by the input unit, and the second image, which is stored on the memory unit, an output unit configured to output an image combined by the combination unit, and a storage control unit configured, if the first image has been input by the input unit, the first image input by the input unit and the second image stored on the memory unit have been combined together by using the combination unit, and a job for outputting the combined image by using the output unit is to be executed, to store on a storage unit the first image input by the input unit and reference information, which is information for referring to the second image and which is stored on the memory unit when the second image is stored on the memory unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 4 is a chart illustrating example job types according to an exemplary embodiment of the present invention.

FIGS. 5A and 5B illustrate an example of a log of a copy job according to an exemplary embodiment of the present invention.

FIGS. 6A and 6B illustrate an example of a log of a box storage job according to an exemplary embodiment of the present invention.

FIG. 7 illustrates an example of a log of a box print job according to an exemplary embodiment of the present invention.

FIGS. 13A and 13B illustrate an example of a chart storing a list of the logs of the copy job that includes image combination processing when a plurality of form documents is used according to an exemplary embodiment of the present invention.

FIG. 15 illustrates an example of a chart storing a list of the logs of the copy job that includes image combination processing when a plurality of form documents is used according to an exemplary embodiment of the present invention.

DESCRIPTION OF THE EMBODIMENTS

Various exemplary embodiments, features, and aspects of the invention will be described in detail below with reference to the drawings.

Figure 1:
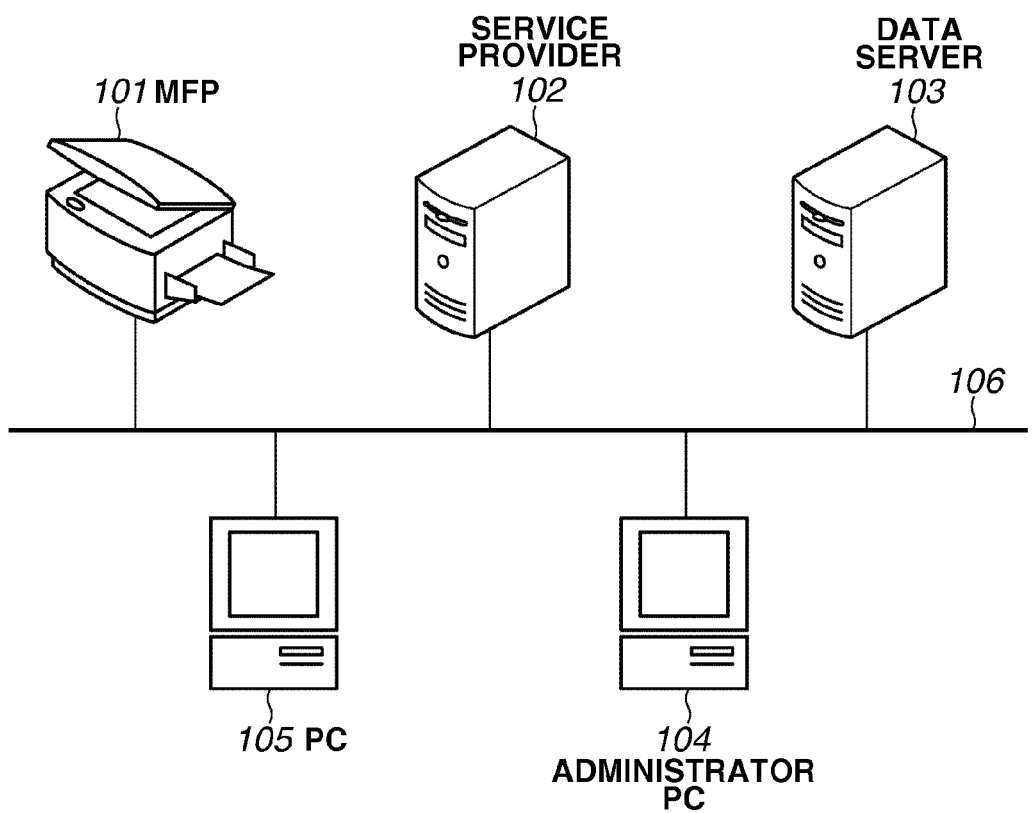
FIG. 1 illustrates an example configuration of a system according to an exemplary embodiment of the present invention.

FIG. 1 illustrates an example basic configuration of a system according to a first exemplary embodiment of the present invention.

The system according to the present exemplary embodiment includes the MFP 101 as an example of image processing apparatuses, a service provider 102, a data server 103, and an administrator PC 104, which are in communication with one another via a network 106.

The MFP 101 executes various jobs, such as a copy job, a print job, or a send job. A copy job is a job for printing an image of a document read by using a scanner. A print job is a job for printing the image received from a personal computer (PC) 105. A send job is a job for transmitting the image of the document read by using the scanner to the PC 105.

In addition, the MFP 101 includes an image combination function. The image combination function is a function for combining a plurality of images together and for printing or transmitting the combined image. The MFP 101 also includes an archiving function. The archiving function is a function for storing log information of an executed job on a storage device of the MFP 101 or on the data server 103 to easily identify who has executed the job by processing what image and the time of execution of the job, later.

The log information includes an image log, which is a copy of the image data processed by executing the job, and history information, such as a user ID of the user who has executed the job, the date and time of start of the job, and the date and time of end of the job (hereinafter simply referred to as a "job log").

The service provider 102 is a server configured to process the log information stored on the MFP 101. The service provider 102 receives and temporarily stores the log information transmitted by a program operating on the MFP 101.

In addition, the service provider 102 executes conversion and optical character recognition (OCR) processing on the image data included in the log information, when necessary. Subsequently, the service provider 102 stores the processed log information on the data server 103.

In the example illustrated in FIG. 1, the service provider 102 and the data server 103 are provided separately from each other. However, alternatively, the service provider 102 and the data server 103 can be integrally provided. In the present exemplary embodiment, the log information includes an image log and history information. The image log is a copy of the image data processed by the job. More specifically, the image log describes what image data has been processed by the job.

The history information is also referred to as a "job log". The history information includes the date and time of execution of the job, the user ID of the user who has executed the job, and information about a result of executing the job.

The data server 103 stores the log information which has been transmitted from the service provider 102. In addition, the data server 103 includes a search function for searching for specific log information from among the stored log information.

On the administrator PC 104, a web application, which is configured to acquire and display the log information stored on the data server 103 from the data server 103, operates. The web application can receive a search condition from the user, transmit the search condition to the data server 103, and receive and display a result of the search executed by the data server 103 according to the transmitted search condition.

The PC 105 is a client PC. The PC 105 generates image data by using an application, and transmits the generated image data to the MFP 101.

Figure 2:
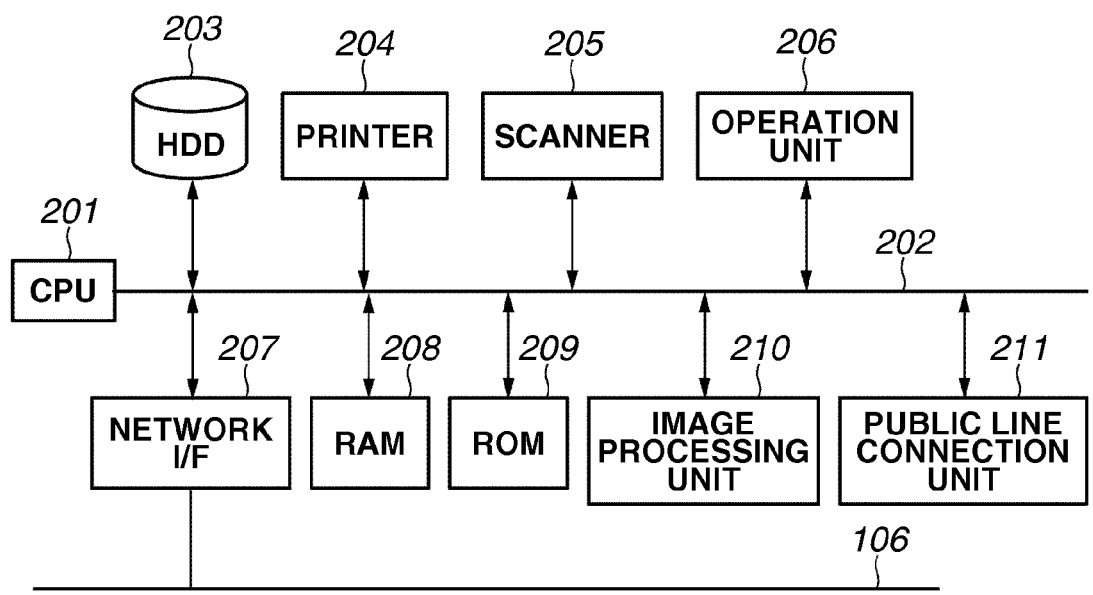
FIG. 2 is a block diagram illustrates an example configuration of an MFP according to an exemplary embodiment of the present invention.

FIG. 2 is a block diagram illustrating an example configuration of the MFP 101. Referring to FIG. 2, the MFP 101 includes a central processing unit (CPU) 201, a hard disk drive (HDD) 203, a printer 204, a scanner 205, an operation unit 206, a network interface (I/F) 207, a random access memory (RAM) 208, a read-only memory (ROM) 209, an image processing unit 210, and a public line connection unit 211, which are in communication with one another via the bus 202.

The CPU 201 integrally controls an operation of the MFP 101 by loading and executing a program from the ROM 209 or the HDD 203. For example, the CPU 201 controls the storage of an image on the HDD 203 and the display of a screen on the operation unit 206, which will be described in detail below.

The HDD 203 is a storage device (storage unit) configured to store various types of programs, information about a job to be executed, image data to be processed, and log information about the job that has been executed. In addition, the HDD 203 has the box function. The box function is a function for dividing the HDD 203 into a plurality of storage areas and storing the image data input by the user into a designated storage area of the plurality of storage areas.

The printer 204 prints an image on a sheet according to the image data stored on the HDD 203.

The scanner 205 includes a document stand, an auto document feeder (ADF), and a reading unit, such as a reading sensor. The scanner 205 reads an image of a document set on the document stand or the ADF. In addition, the scanner 205 generates image data corresponding to the read document. The generated image data is stored on the HDD 203.

The operation unit 206 includes a determination unit with a touch panel and hard keys. The operation unit 206 displays an operation screen and a status of progress of the job to the user via the display unit. In addition, the operation unit 206 receives a user operation via the touch panel and the hard keys.

The network I/F 207 controls a data communication with an external apparatus via the network 106.

The RAM 208 functions as a work area of the CPU 201. The ROM 209 stores a program loaded by the CPU 201.

The image processing unit 210 executes image processing, such as resolution conversion, color conversion, or image combination on the image data stored on the HDD 203.

The public line connection unit 211 is connected to a public line and controls a communication executed via the public line.

Figure 3:
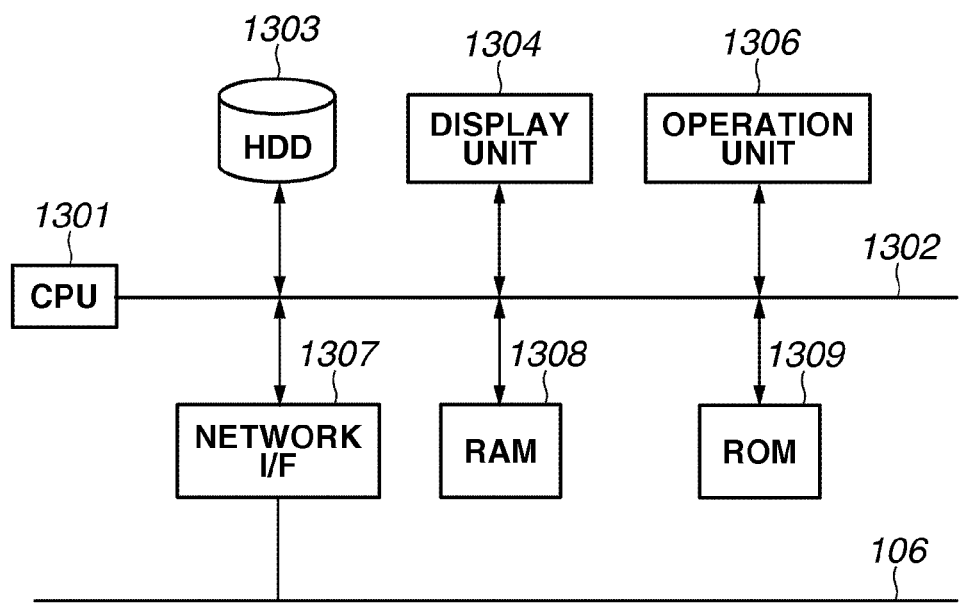
FIG. 3 is a block diagram illustrating an example configuration of a service provider according to an exemplary embodiment of the present invention.

FIG. 3 is a block diagram illustrating an example configuration of the service provider 102.

Referring to FIG. 3, a CPU 1301 integrally manages an operation of the apparatus by reading and executing a program stored on a ROM 1309 or an HDD 1303.

The HDD 1303 is a storage device that stores various programs and other data. A display unit 1304 is constituted by a liquid crystal display (LCD) or a cathode ray tube (CRT) display. The display unit 1304 displays various types of screens according to instructions from the CPU 1301. An operation unit 1306 is constituted by a mouse and a keyboard. The operation unit 1306 receives a user operation.

The network I/F 1307 controls a data communication with an external apparatus via the network 106. The data server 103, the administrator PC 104, and the PC 105 have a configuration similar to the configuration of the service provider 102.

An example method for storing log information about a job executed by the MFP 101 while saving the capacity of the storage device to be used (i.e., the HDD 203 or the HDD 1303 of the data server 103) will be described in detail below with reference to FIG. 4.

Referring to FIG. 4, the MFP 101 executes various types of jobs, such as a copy job, a page description language (PDL) print job, a scan/box storage job, a receiving job (a FAX/I-FAX receiving job), a send job (a FAX/I-FAX send job), a box print job, or a receiving and print job. The MFP 101 changes the content of the log information to be stored on the storage device according to the type of the job.

In addition, the MFP 101 stores a table illustrated in FIG. 4 on the HDD 203. Which of an input job and an output job each type of job is can be identified by referring to the table.

A job type column 7001 includes a job type, such as a copy job or a PDL print job. A job type column 7002 stores information about which of an input job and an output job each type of job is. An input job is a job for inputting image data. An output job is a job that does not include an input of image data.

In addition, a "recording of an actual image" column 7003 stores a setting as to which of a job for storing the image data itself as an image log and a job for storing reference information for referring to the image data as history information without storing the image data itself (an actual image) the input job is. In executing an input job, the MFP 101 stores a copy of the image data input by executing the input job as an image log on the HDD 203 together with the history information.

On the other hand, in executing an output job, the MFP 101 does not store the image data itself (the actual image) because the image data to be output by executing the output job has already been stored on the HDD 203 at the timing of execution of the input job. Instead, the MFP 101 stores reference information for referring to the image data input at the timing of execution of the input job on the HDD 203.

A job type 7202 for each type of job and a setting 7303 as to whether to record an actual image will be described in detail below.

A copy job 7101 is a job for reading an image of a document by using the scanner 205 and for printing the read document image by using the printer 204. The copy job 7101 is a job for reading an image of a document by using the scanner 205 and for inputting the read document image as image data. Accordingly, a job type field 7002 stores an "input job 7102" and information "enabled" 7103 for the actual image recording field 7003. The numeric figures used in FIG. 4 with parentheses are used to explain the contents in this table.

A PDL print job 7201 is a job for receiving image data from an external PC 105 and printing the received image data on the printer 204. More specifically, in the PDL print job 7201, image data is received from the external PC 105. Accordingly, the PDL print job 7201 is an input job for inputting image data. Therefore, the job type 7002 corresponding to the PDL print job 7201 stores a parameter value "input job 7202", which describes that the job requires an input of an image. The actual image recording field 7003 corresponding to the PDL print job 7201 stores a parameter value "enabled" 7203.

A scan job/box storage job 7301 is a job for reading an image of a document, inputting data of the read document image, and storing the image data on the HDD 203. Alternatively, the scan job/box storage job 7301 is a job for inputting image data from the external PC 105 via the network I/F 207 and storing the input image data on the HDD 203. Accordingly, the job type field 7002 corresponding to the scan job/box storage job 7301 stores a parameter value "input job 7302". The actual image recording field 7003 corresponding to the scan job/box storage job 7301 stores a parameter value "enabled 7303".

A receiving job (FAX/I-FAX receiving job) 7401 is a job for printing the image by using the printer 204 according to the image data received via the public line connection unit 211. Accordingly, the job type field 7002 stores a parameter value "input job 7402". The actual image recording field 7003 corresponding to the receiving job (FAX/I-FAX receiving job) 7401 stores a parameter value "enabled 7403".

A send job (FAX/I-FAX/send job) 7501 is a job for transmitting the image data stored on the HDD 203 via the public line connection unit 211 or the network I/F 207.

In a send job, no image data is input. Accordingly, the job type field 7002 corresponding to the send job 7501 stores a parameter value "output job 7502". The actual image recording field 7003 corresponding to the send job 7501 stores a parameter value "disabled 7503". Accordingly, in executing the send job 7501, the image processing apparatus stores reference information for referring to the image data instead of storing the image data itself.

A job for transmitting image data of a document read by using the scanner 205 via the public line connection unit 211 or the network I/F 207 is handled as the above-described scan job.

A box print job/receiving print job 7601 is a job for printing the image by the printer 204 according to the image data stored on the HDD 203. Accordingly, the job type field 7002 corresponding to the box print job/receiving print job 7601 stores a parameter value "output job 7602". The actual image recording field 7003 corresponding to the box print job/receiving print job 7601 stores a parameter value "disabled 7603".

Accordingly, in executing the box print job/receiving print job 7601, the image processing apparatus records reference information for referring to the image data instead of storing the image data itself.

A form registration job 7701 is a job for reading a form document by using the scanner 205 and registering the read document image on the HDD 203 as a form document (form image).

In the form registration job 7701, a form document is read and the read image of the form document is input as image data. Accordingly, the job type field 7002 corresponding to the form registration job 7701 stores a parameter value "input job 7702" and the actual image recording field 7003 corresponding to the form registration job 7701 stores a parameter value "enable 7703".

In the present exemplary embodiment, the method for reading and handling the form document is not limited to the method for reading the form document by using the scanner 205 and registering the read form document image. Alternatively, for example, a form document generated by the external PC 105 can be received and registered by the MFP 101. In this case, a job for registering the form document generated by the external PC 105 and received by the MFP 101 is included in a form registration job.

FIGS. 5A and 5B illustrate an example of log information of a copy job for generating two copies of documents including three A4-size document, which is executed by the MFP 101. FIG. 5A illustrates an example of an image log. FIG. 5B illustrates an example of a job log.

An image log 301 is an image log of a first sheet (the first page) of the document read by the scanner 205. The image log is data generated by the CPU 201 by copying the image data processed by executing the job according to the log information.

An image attribute 302 is an image attribute of the image log 301. The image attribute 302 is constituted by an image type (image format) 303, a resolution 305, and an image size 307.

In the example illustrated in FIG. 5A, the image format is "Joint Photographic Experts Group (JPEG)" 304. The resolution is 600 dots per inch (dpi) (306) in X and Y directions. For the image size, X=4,960 and Y=7,040 as illustrated in a field 308. The image attribute is information attached to the image log. The image attribute is stored on the storage device together with the image log when the image log is stored on the storage device.

An image log 309 is an image log for the second sheet of the document. An image log 311 is an image log for the third sheet of the document. An image attribute 310 is an attribute of an image of the second sheet of the document. An image attribute 311 is an attribute of an image of the third sheet of the document.

History information (job log) 313 is history information about the copy job. The history information includes a plurality of types of information described below:

|         |       |
|---------|-------|
| JobKind | 314   |
| UserID  | 316   |
| StartTime | 318 |
| EndTime | 320   |
| Result  | 322   |
| PaperCount | 324 |
| Copies  | 0326  |
| DocumentID1 | 328 |
| DocumentLog1 | 330 |

The element <JobKind> 314 describes the type of a job, such as a copy job or a FAX job. The element <UserID> 316 describes a user ID of the user who has execute the job. The element <StartTime> 318 describes the time of start of the job. The element <EndTime> 320 describes the time of end of the job. The element <Result> 322 describes a result of executing the job. The element <PaperCount> 324 describes the number of sheets of the document. The element <Copies> 326 describes the number of copies designated by the user. The element <DocumentID1> 328 describes an ID for uniquely identifying the image log. The element <DocumentLog1> 330 describes the presence or absence of an image log.

In the examples illustrated in FIGS. 5A and 5B, the job kind is "copy job 315". The user ID is "0123456789" 317. The job start time is "10:05:40 of Jun. 22, 2010" 319. The job end time is "10:06:05 of Jun. 22, 2010" 321. In addition, the job execution result is "OK" 323. The number of sheets of the document is "three" 325. The number of outputs is "2" 327. The DocumentID 328 stores a parameter value "00000001" 329. The image log is "YES" 331.

The Document ID 328 is an ID for identifying a document (continuous image data) input by the executed job. The Document ID 328 is uniquely assigned by the image processing unit 210 to each document. For example, if a document including ten pages is scanned by using a scanner and the read image of the document is stored on the HDD 203, the CPU 201 assigns one document ID to the image of ten pages, which is handled as one document and stores the document image and the document ID on the HDD 203.

The document ID is associated with the document stored on the HDD 203 and is stored on the HDD 203. The value of the document ID is determined in the manner described below. That is, the CPU 201 assigns an initial value "00000001" of the document ID to a document that has been input first. Subsequently, the CPU 201 increments the value by 1 every time a new document is input and assigns the incremented value as the value of the document ID.

Because a copy job is an input job as defined by the chart illustrated in FIG. 4, the image data itself is stored as an image log in executing a copy job.

A box storage job is an example of an input job other than the copy job. FIGS. 6A and 6B illustrate an example of log information stored when a box storage job for reading images of three A4-size sheets of a document by using the scanner 205 and for storing the read document image on the HDD 203, which is executed by the MFP 101, is executed. FIG. 6 illustrates an example of an image log. FIG. 6B illustrates an example of a job log.

An image log 401 is an image log of a first sheet (the first page) of the document read by the scanner 205. An image attribute 402 is an image attribute of the image of the first sheet of the document. The image attribute 402 is constituted by an image type (image format) 403, a resolution 405, and an image size 407.

In the example illustrated in FIG. 6A, the image format is JPEG (404). The resolution is 600 dpi 406 in X and Y directions. For the image size, X=4,960 and Y=7,040 as illustrated in a field (408).

An image log 403 is an image log for the second sheet of the document. An image log 405 is an image log for the third sheet of the document. An image attribute 404 is an attribute of an image of the second sheet of the document. An image attribute 405 is an attribute of an image of the third sheet of the document. Information 407 is history information (a job log) for the box storage job. The history information includes a plurality of types of information described below.

The element <JobKind> 314, the element <UserID> 316, and the element <StartTime> 318 are similar to those described above with reference to FIGS. 5A and 5B.

In the examples illustrated in FIGS. 6A and 6B, the job kind is a box storage job 409. The user ID is "0123456789". The job start time is 10:15:10 of Jun. 22, 2010. The job end time is 10:15/28 of Jun. 22, 2010. The job execution result is "OK". The number of sheets of the document is "three" (411). The number of outputs is null because printing is not executed. The image log ID stores a parameter value "00000002" (415). The image log is "YES".

Because a box storage job is an input job as defined by the chart illustrated in FIG. 4, the image data itself is stored as an image log in executing a box storage job.

In executing an input job for inputting image data, such as a copy job or a box storage job, both the image log and the history information are stored. On the other hand, in executing an output job in which no image data is input, no image log is stored. Instead, in executing an output job, reference information, which is information for referring to the image log stored when the input job corresponding to the executed output job is executed, is stored as history information. In the following description, an example of log information to be stored when an output job is executed will be described in detail.

FIG. 7 illustrates an example of log information, which is stored in executing a box print job for printing two copies of image data of three pages, which has been stored on the HDD 203, by using the printer 204.

The log information stored when a box print job is executed does not include an image log but includes the history information (the job log) only. This is intended to prevent an overlapped storage of the image log when the output job is executed because the image log of the image data to be printed by executing the box print job has been stored when an input job for inputting the image data is executed.

In executing a box print job, the MFP 101 stores the document ID, which describes what image data has been printed, instead of not storing the image data itself by storing an image log. In the example illustrated in FIG. 7, the document ID has a value "00000002" (509).

The document ID 509 has the same value of the document ID of the box storage job illustrated in FIGS. 6A and 6B. In other words, it can be identified that the image data printed by the box print job is the image data 401, 402, and 405 input by the box storage job illustrated in FIGS. 6A and 6B.

In the example illustrated in FIG. 7, the "presence of document log 1" field 510 has a parameter value "NO" 511, which indicates that the log information does not include an image log.

As described above, in executing an output job, the capacity of the storage device to be used for storing the log information can be saved by not storing the image log. In addition, in executing an output job, by storing reference information (the document ID) for referring to the image log input when the input job is executed, instead of storing the image log, the output image data can be identified.

The log information about a copy job that requires a combination of images will be described in detail below.

Figure 8:
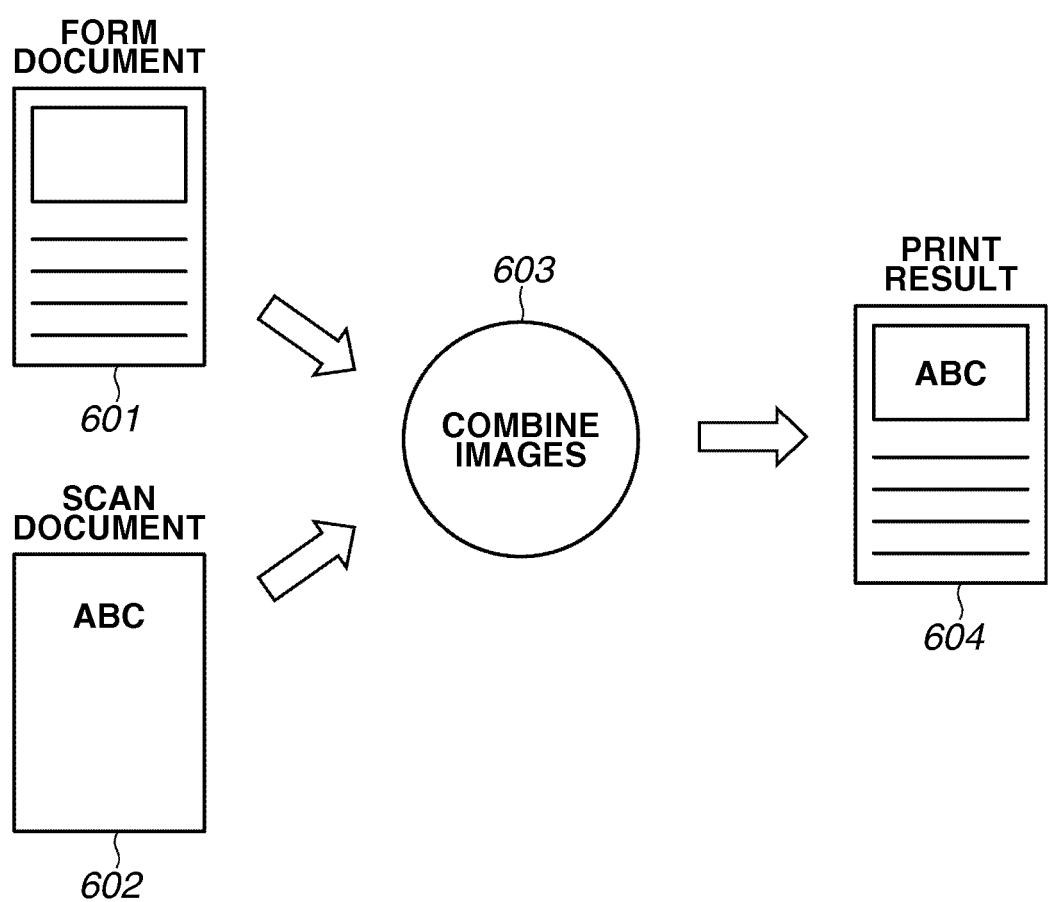
FIG. 8 illustrates an example image combination method according to an exemplary embodiment of the present invention.

FIG. 8 illustrates an example image combination method according to the present exemplary embodiment. Referring to FIG. 8, it is supposed that a document 601 that is a form (hereinafter simply referred to as a "form document" or a "form image") has been previously registered by the user to the HDD 203 of the MFP 101.

Referring to FIG. 8, the MFP 101 executes image combination 603 by combining an image of a document 602, which has been read by using the scanner 205 (a first image), with an image of a form document 601 (a second image) by using the image processing unit 210. In addition, the MFP 101 outputs a print product 604 by using the printer 204.

More specifically, when a form to be registered is designated by the user via the operation unit 206, the MFP 101 displays on the operation unit 206 a guidance message which prompts the user to set a document to be the form document on the scanner 205.

Subsequently, when the document is set on the scanner 205 and a start key is pressed, the MFP 101 reads the document by using the scanner 205 and registers the image data of the read document to the HDD 203 as a form document. A job for registering a form document is referred to as a "form registration job".

When combination printing is instructed by the user, the form document registered by the form registration job is read from the HDD 203 and is combined with the image data of the document read by using the scanner 205.

Figures 9A, 9B:
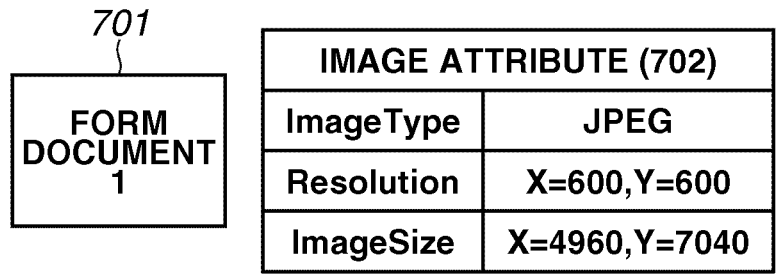
FIGS. 9A and 9B illustrate an example of a log of form document registration processing according to an exemplary embodiment of the present invention.

Examples of the log information about the copy job that requires the image combination processing will be described in detail below with reference to FIGS. 9A, 9B, 10A, and 10B. FIGS. 9A and 9B illustrate an example of the log information stored when an image of an A4-size document, which is the form, is read by using the scanner 205 and stored on the HDD 203 of the MFP 101.

An image log 701 is an image log of a form document 1. An image attribute 702 is an image attribute, which is an attribute of the form document 1. Information 703 is history information (a job log). In the example illustrated in FIGS. 9A and 9B, a job kind 704 has a parameter value "form registration" 705. In addition, the user ID has a value "0123456789". The job start time is 10:25:10 of Jun. 22, 2010. The job end time is 10:25:15 of Jun. 22, 2010.

In addition, the job execution result is "OK". The number of sheets of the document is "three" 411. The number of outputs is null because printing is not executed. The image log ID stores a parameter value "00000002" 415. The image log is "YES".

Because a form registration job is an input job as defined by the chart illustrated in FIG. 4, the image data itself is stored as an image login executing a form registration job.

Subsequently, the user instructs combination printing via the operation unit 206. When the combination printing is instructed, the MFP 101 prompts the user to designate a form document from among those stored on the HDD 203.

When the start key is pressed by the user, the MFP 101 reads the document by using the scanner 205. In addition, the MFP 101 reads the form document designated by the user from the HDD 203. Furthermore, the MFP 101 combines the read image data of the document with the form document by using the image processing unit 210. In addition, the MFP 101 prints the combined image data by using the printer 204.

Figures 10A, 10B:
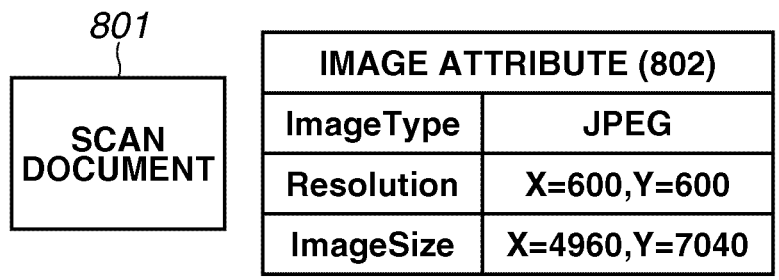
FIGS. 10A and 10B illustrate an example of a log of a copy job that includes image combination processing when a plurality of form documents is used according to an exemplary embodiment of the present invention.

In executing a copy job that requires the above-described image combination, the MFP 101 stores the log information illustrated in FIGS. 10A and 10B.

FIGS. 10A and 10B illustrate an example of log information when the form document registered by the form registration job is designated, the designated form document is combined with the scan document, and the combined image data is printed.

A job kind 804 is stored as a copy job 805. The user ID has a value "0123456789". The job start time is 10:30:20 of Jun. 22, 2010. The job end time is 10:30:35 of Jun. 22, 2010. The job execution result is "OK". The number of sheets of the document is "one" 411. The number of outputs is "one".

In executing a copy job that requires image combination, two document IDs are stored in the history information.

The first document ID is a document ID1 807 of the form document. In the present exemplary embodiment, a value "00000003" (807) is stored as a value of the element <DocumentId> 807 because the form document registered by the form registration job, which is illustrated in FIGS. 9A and 9B, has been designated as the form document. In addition, because an element <DocumentLog1> 808 has a value "NO" 809, it can be known that the log information of the image data has been already stored.

On the other hand, the second document ID is a document ID2 810, which describes the image data of the document ready by the scanner 205 when the copy job that requires image combination is executed. The document ID2 810 has a value "00000004" 811. An element <DocumentLog2> 808 has a value "YES" 813, which indicates that the image log has been already stored. The image log indicated with the value "00000004" 811 is a scan document 801 illustrated in FIG. 8A.

In the example of the log information illustrated in FIGS. 10A and 10B, the form document is identified by the element <DocumentID1> and the scan document is identified by the element <DocumentID2>. Accordingly, it can be identified that the job whose history has been stored is a job that requires image combination by referring to the log information.

Identification information for identifying which of a form document and a scan document the document identified by the element <DocumentID1> is, can be associated with the element <DocumentID1> and stored.

Similarly, for the element <DocumentID2>, identification information for identifying which of a form document and a scan document the document identified by the element <DocumentID2> is, can be associated with the element <DocumentID2> and stored.

Figure 11:
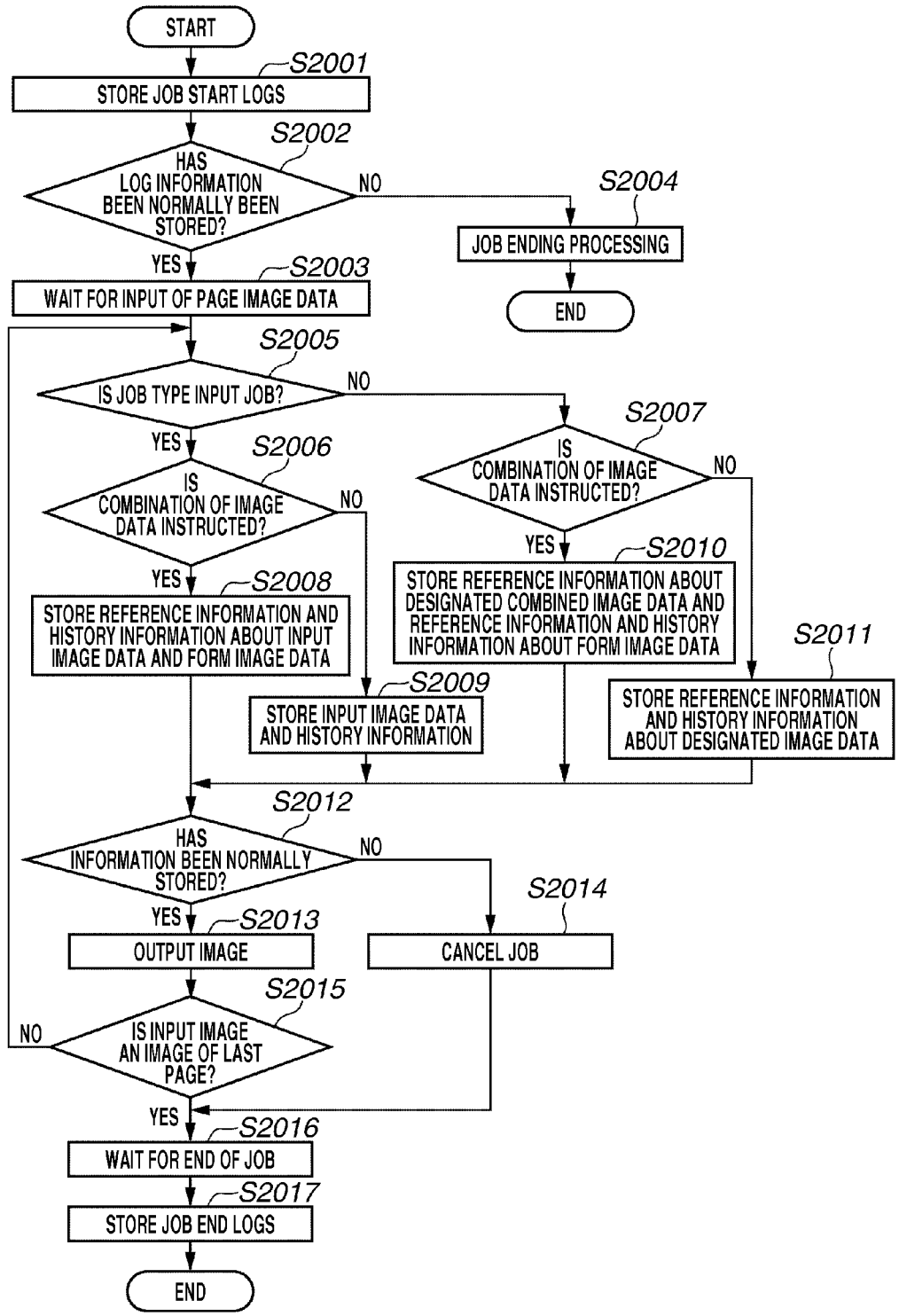
FIG. 11 is a flow chart illustrating an example flow of processing executed by the MFP 101 to perform a job according to an exemplary embodiment of the present invention.

FIG. 11 is a flow chart illustrating an example flow of processing executed by the MFP 101 to perform a job according to the present exemplary embodiment. Each step of the flow chart of FIG. 11 is implemented by the CPU 201 by loading a program from the ROM 209 and executing it.

When the user starts utilizing the MFP 101, the CPU 201 prompts the user to enter the user's user ID and a password. The CPU 201 authenticates the user according to the input user ID and the password.

When the user is normally authenticated, the CPU 201 allows the user to log into the MFP 101. In the above-described manner, the user is allowed by the CPU 201 to utilize the MFP 101. In addition, the CPU 201 stores the input user ID on the HDD 203. The CPU 201 identifies the user who is currently using the MFP 101 according to the stored user ID.

In addition, when the start key of the operation unit 206 is pressed by the user to start executing the job, the processing illustrated in FIG. 11 starts. Referring to FIG. 11, in step S2001, the CPU 201 records log information at the start of the job. More specifically, the CPU 201 secures an area necessary for storing the log information on the HDD 203. In addition, the CPU 201 writes items determined at this timing, such as the user ID, the job start time, and the document ID, on the area.

In particular, the document ID is significant because the document ID is used in identifying an image stored on the data server 103 in the unit of a document. For example, if an input job is to be executed, the CPU 201 generates and stores a new document ID because the document of the input job is a new document. The CPU 201 writes items whose value is not currently available when the job ends. At this timing, the CPU 201 secures an area for writing the items whose value is not currently available, which is to be written when the job ends.

In step S2002, the CPU 201 determines whether the log information has been stored in step S2001. If it is determined that the log information has not been stored or if the necessary area has not been secured (No in step S2002), then the CPU 201 does not continue the execution of the job, and the processing proceeds to step S2004. In step S2004, the CPU 201 executes processing for ending the job. When the job ending processing is completed, the processing of the flow chart illustrated in FIG. 11 ends.

On the other hand, if it is determined that the necessary area has been secured and the log information has been normally stored (Yes in step S2002), then the processing proceeds to step S2003.

In step S2003, the CPU 201 waits until image data is input. When image data of one page is input, the processing proceeds to step S2005. In executing an output job, the input in step S2003 is substituted with a reading of an image from the HDD 203.

In step S2005, the CPU 201 determines whether the job type 7002 is an input job. If it is determined that the job type 7002 is an input job, such as a copy job, a box storage job, or a receiving job (Yes in step S2005), then the processing proceeds to step S2006. On the other hand, if it is determined that the job type 7002 is an output job, such as a send job or a box print job (No in step S2005), then the processing proceeds to step S2007.

In step S2006, the CPU 201 determines whether it has been instructed by the user to combine image data via the operation unit 206. If it is determined that the combination of image data has been instructed by the user (Yes in step S2006), then the processing proceeds to step S2008. On the other hand, if it is determined that the combination of image data has not been instructed (No in step S2006), then the processing proceeds to step S2009.

In step S2008, the CPU 201 generates a copy of the image data input in step S2003. In addition, the CPU 201 stores the generated image data on a log information recording area of the HDD 203 as an image log. Furthermore, the CPU 201 stores the reference information (the document ID) for referring to the image data (the image log) of the form document designated by the user on the log information recording area of the HDD 203.

It is assumed that the image log of the form document has been already stored on the log information storage area of the HDD 203 or on the data server 103. Accordingly, the CPU 201 stores the document ID assigned to the designated form document on the log information storage area of the HDD 203 as the reference information without storing the image log of the form document again.

Accordingly, an administrator of the system can identify an image log having the same document ID as the document ID of the form document included in the log information stored on the HDD 203. In other words, the system administrator can later verify what form document has been used in the combination.

The log information stored on the HDD 203 is periodically transmitted by the CPU 201 to the data server 103 via the service provider 102. Accordingly, the system administrator can identify an image log having the same document ID as the document ID of the form document included in the log information stored on the data server 103. In other words, the system administrator can later verify what form document has been used in the combination.

In step S2008, the CPU 201 stores other history information, such as the number of sheets (the element <PaperCount>) included in the document on the log information recording area of the HDD 203. Then the processing proceeds to step S2012.

In step S2009, the CPU 201 stores the image data input in step S2003 on the log information recording area of the HDD 203 as an image log. In addition, the CPU 201 stores the history information on the log information storage area of the HDD 203 as the log information.

Then the processing proceeds to step S2012. The log information stored in the above-described manner is periodically transmitted by the CPU 201 to the data server 103 via the service provider 102.

If the processing has proceeded from step S2005 to step S2007, in step S2007, the CPU 201 determines whether the user has instructed to combine image data. If it is determined that the combination of image data has been instructed (Yes in step S2007), then the processing proceeds to step S2010. On the other hand, if it is determined that the combination of image data has not been instructed, then the processing proceeds to step S2011.

In step S2010, the CPU 201 stores the document ID of the image data that has been designated by the user to be output (i.e., image data to be combined) on the log information recording area of the HDD 203 as reference information about the image data. In addition, the CPU 201 stores the document ID of the image data of the form document (the combined image data) on the log information recording area of the HDD 203 as reference information about the image data of the form document.

In addition, the CPU 201 stores the history information, such as the number of outputs, on the log information storage area of the HDD 203. If an image to be output by a box print job is combined with the form document and the combined image is to be printed, the processing proceeds to step S2010. It is supposed that the image log of the image data to be output by an output job has been already stored when the job for inputting the image data is executed.

Accordingly, in executing an output job, the CPU 201 stores the same document ID as the document ID corresponding to the image log stored when the input job is executed. Accordingly, the system administrator can easily identify the content of the output image even if no image log of the image output by the output job is stored.

By executing the processing in step S2010, two document IDs are stored as log information about a job that requires image combination. Accordingly, the system administrator can easily recognize that the job corresponding to the log information that stores the two document IDs is a job that requires image combination by referring to the log information.

In addition, according to the two assigned document IDs, two documents that have been combined together can be identified. Then, the processing proceeds to step S2012. The log information stored in the above-described manner is periodically transmitted by the CPU 201 to the data server 103 via the service provider 102.

On the other hand, in step S2011, the CPU 201 stores the document ID of the image data designated by the user to be output (the image data to be combined) on the log information recording area of the HDD 203 as reference information.

In addition, the CPU 201 stores other history information on the log information storage area of the HDD 203. As described above, in executing an output job, the CPU 201 stores the document ID corresponding to the image log stored when the input job is executed. Accordingly, the system administrator can easily identify later the content of the image that has been output without storing an image log of the image output by the output job.

Then, the processing proceeds to step S2012. The log information stored in the above-described manner is periodically transmitted by the CPU 201 to the data server 103 via the service provider 102.

In step S2012, the CPU 201 determines whether the log information has been normally stored as a result of executing the processing for storing the log information in any of steps S2008 through S2011. If it is determined that the log information has been normally stored (Yes in step S2012), then the processing proceeds to step S2013. On the other hand, if it is determined that the log information has not been normally stored (No in step S2012), then the processing proceeds to step S2014.

In step S2013, the CPU 201 executes processing for cancelling the job. Then, the processing proceeds to step S2016. By executing the above-described processing, the present exemplary embodiment can prevent image data whose log information has not been stored on the log information storage area of the HDD 203 from being printed or transmitted.

In step S2013, the CPU 201 stores the image input in step S803 on the HDD 203. In executing a box storage job, a scan job, or a receiving job, the processing is completed when the image data is stored on the HDD 203. On the other hand, if a copy job or a PDL print job is to be executed, the CPU 201 prints the job on the printer 204. In addition, when a send job is to be executed, the CPU 201 executes transmission processing via the network I/F 207 and the public line connection unit 211.

When the processing in step S2013 is completed, the processing proceeds to step S2015. In step S2015, the CPU 201 determines whether the image received in step S2003 is the image of the last page of the document. If it is determined that the received image is the image of the last page of the document (Yes in step S2015), then the processing proceeds to step S2016. On the other hand, if it is determined that the received image is not the image of the last page of the document (No in step S2015), then the processing returns to step S2003 and the CPU 201 waits for a next image to be input.

In step S2016, the CPU 201 executes job ending processing and waits until the job ends.

In step S2017, the CPU 201 writes the log information about the item that is not written yet at the time of the processing in step S2001, such as the job end time and the job execution result, on the log information storage area of the HDD 203. When the log information is completely stored, the processing of the flow chart illustrated in FIG. 11 ends.

As described above, in the present exemplary embodiment, the CPU 201 of the MFP 101 periodically transmits the log information stored on the HDD 203 to the data server 103 via the service provider 102.

However, the present exemplary embodiment is not limited to this. More specifically, alternatively, the CPU 201 can transmit the log information directly to the data server 103 without using the service provider 102, and store the log information on the data server 103.

By executing the above-described control, the present exemplary embodiment can allow the system administrator to easily identify later who has input what image at what time by executing an input job, and who has output what image at what time by executing an output job.

In executing an output job, the present exemplary embodiment stores the document ID corresponding to the image log of the image input when the input job is executed. Accordingly, the present exemplary embodiment can allow the system administrator to easily identify later which image has been output without storing the image log in an overlapping manner. Therefore, the present exemplary embodiment having the above-described configuration can save the capacity of the HDD 203 necessary for storing the log information.

In addition, if a job that requires image combination has been executed, the system administrator can easily identify later who has output what image at what time by executing the job. In addition, when a job that requires image combination is executed, two document IDs are stored as the log information. Accordingly, if the system administrator views the log information later, the system administrator can easily recognize that the job that requires image combination has been executed.

In addition, by referring to the document identified by each of the two document IDs, the system administrator can easily identify the document that has been combined by the job that requires image combination and the image included in the document.

In the first exemplary embodiment described above, the CPU 201 combines image data of one form document and image data of a scan document together. In a second exemplary embodiment of the present invention, a method for storing log information when image data of two form documents and image data of a scan document are combined together and the combined image data is printed will be described in detail.

As a case of executing the combination processing by using image data of two form documents, a case where form documents that are different between the front and the back surfaces of the printing sheet are to be combined will be described.

In the present exemplary embodiment, the system configuration and the configuration of each of the MFP 101 and the service provider 102 are the same as those in the first exemplary embodiment described above. Accordingly, the detailed description thereof will not be repeated here.

In the present exemplary embodiment, it is supposed that the form document corresponding to the image log illustrated in FIGS. 9A and 9B, which is described above in the first exemplary embodiment, is used as the form document to be combined on the front surface of the printing sheet. In other words, the log information illustrated in FIGS. 9A and 9B is log information about the form document to be combined on the front surface of the printing sheet.

Figures 12A, 12B:
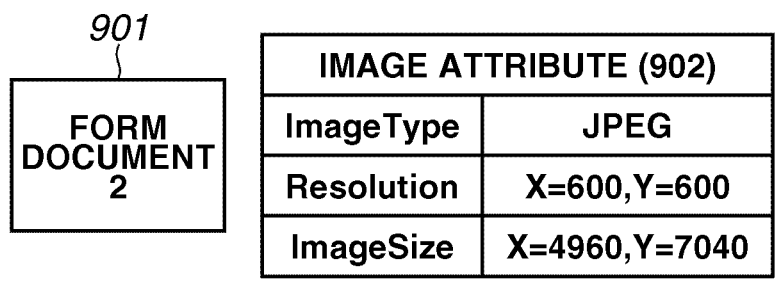
FIGS. 12A and 12B illustrate an example of a chart storing a list of the logs of the copy job that includes image combination processing when a plurality of form documents is used according to an exemplary embodiment of the present invention.

FIGS. 12A and 12B illustrate an example of log information about the form document, which is previously registered to the MFP 101 to execute the combination processing on the back surface of the printing sheet.

Referring to FIG. 12A, an image log 901 is an image log of a form document 2. An image attribute 902 is an attribute of the form document 2. Referring to FIG. 12B, history information 903 is a job log including the elements illustrated in FIG. 12B.

In the examples illustrated in FIGS. 12A and 12B, a job kind 904 has a value "form registration 905". The user ID is "0123456789". The job start time is 10:45:10 of Jun. 22, 2010. The job end time is 10:45:15 of Jun. 22, 2010.

The job execution result is "OK". The number of sheets of the document is "one". The number of outputs is null because printing is not executed by the job. The image log ID stores a parameter value "00000005" 907. The image log is "YES". Because a form registration job is an input job as defined by the chart illustrated in FIG. 4, the image data itself is stored as an image log in executing a form registration job.

Subsequently, the user instructs combination printing via the operation unit 206. When the combination printing is instructed, the MFP 101 prompts the user to designate a form document from among those stored on the HDD 203. When the start key is pressed when a plurality of form documents has been designated by the user, the MFP 101 reads the plurality of documents by using the scanner 205. In addition, the MFP 101 reads the plurality of form documents designated by the user from the HDD 203.

Furthermore, the MFP 101 combines the image data of the read plurality of documents with the plurality of form documents by using the image processing unit 210. Moreover, the MFP 101 prints the combined image data by using the printer 204.

In executing the copy job that requires the image combination, the CPU 201 stores log information as illustrated in FIGS. 13A and 13B.

FIGS. 13A and 13B illustrate an example of log information stored when a copy job is executed for combining images of form documents, which are different between the front and the back surfaces of the printing sheet. In the present exemplary embodiment, it is supposed that a setting has been previously executed to the copy job for reading two A4-size documents by one-sided reading and for printing one copy of the read document image by two-sided printing.

The example illustrated in FIGS. 13A and 13B is different from the log information illustrated in FIGS. 10A and 10B in a point that history information (a job log) 1005 stores three document IDs. A first document ID1 1008 stores a parameter value "00000003" 1009. A field 1010 for the presence of a document log1 has a value "NO" 1011. Accordingly, it can be known that in the job, the user has designated and used the image data whose log information has been already stored.

A second document ID2 1012 has a value "00000005" 1013. A field 1014 for the presence of a document log2 has a value "NO" 1015. Accordingly, it can be known that in the job, similar to the case of the first document ID1 1008, the user has designated and used the image data whose log information has been already stored.

On the other hand, a third document ID3 1016 has a value "00000006" 1017. A field 1018 for the presence of a document log3 has a value "YES" 1019. An image log corresponding to the document ID is the scan document illustrated in FIG. 10A.

The following can be known by referring to the log information illustrated in FIGS. 13A and 13B:

(i) That image data corresponding to the image log 701 has been set as the first form document because the document ID1 1008 matches the document ID1 706, which has been recorded when the form document illustrated in FIG. 9A is registered as described above.

(ii) That the image corresponding to the image log 901 has been set as the second form document because the document ID2 1012 matches the document ID1 906, which has been recorded when the form document illustrated in FIG. 12A is registered as described above.

(iii) That the image data 1001 and 1003, which correspond to the scan document, have been combined with the image data 701 and 901.

In the examples illustrated in FIGS. 13A and 13B, information about with which scan document each of the two form documents has been combined is not stored. However, alternatively, the CPU 201 can store log information that describes a relationship between the form document and the scan document with which the form document has been combined.

Figure 14:
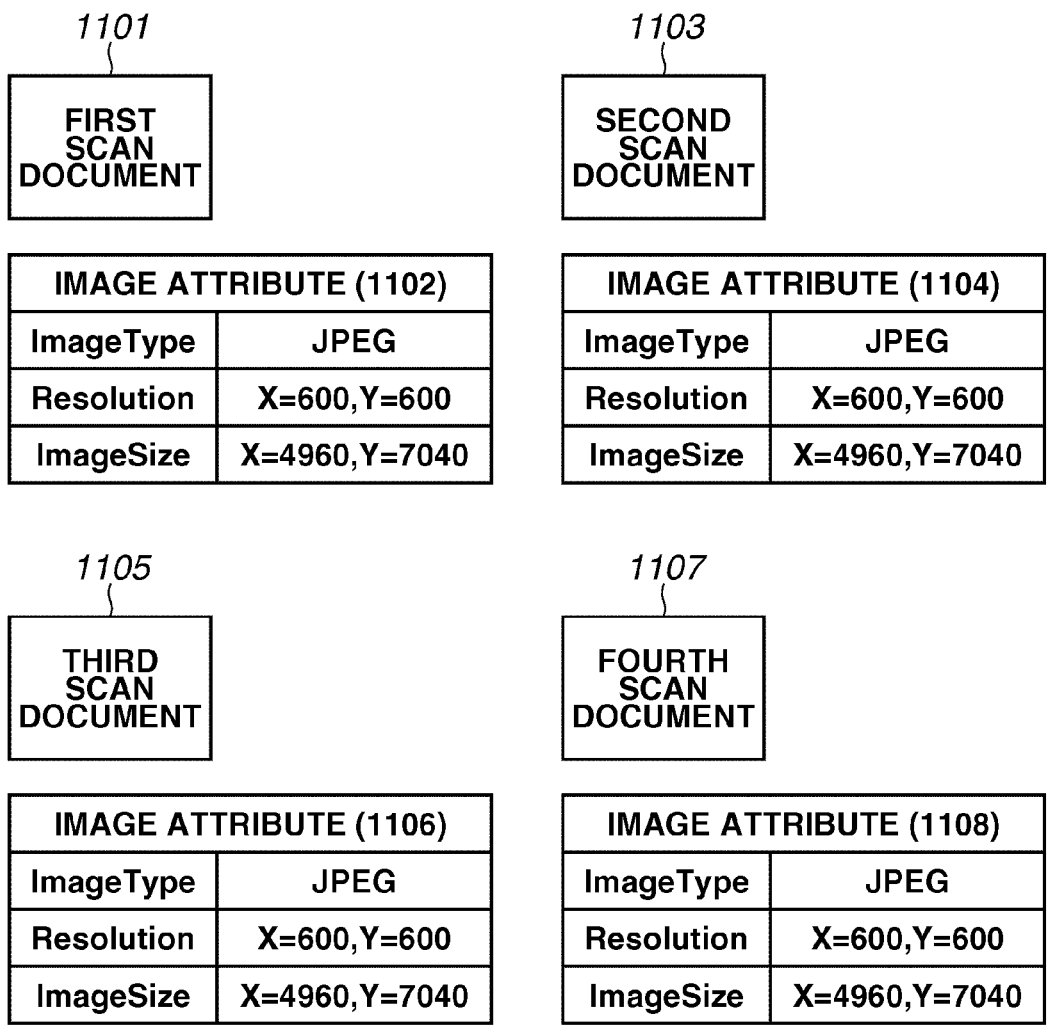
FIG. 14 illustrates an example of a chart storing a list of the logs of the copy job that includes image combination processing when a plurality of form documents is used according to an exemplary embodiment of the present invention.

A method for implementing the above-described configuration will be described in detail below with reference to FIG. 14. FIGS. 14 and 15 illustrate an example of the log information stored when a copy job is executed if the following conditions for combining the image data have been designated by the user as the setting for the combination. It is supposed that a setting has been previously set for reading one surface of four A4-size documents and printing one copy of the read document images by two-sided printing.

More specifically, the log information illustrated in FIGS. 14 and 15 is an example of an image log of a copy job for combining the form document 701 on the front surface of the printing sheet (corresponding to the first and the third sheets of the scan document) and for combining the form document 901 on the back surface (corresponding to the second and the fourth sheets of the scan document) is executed.

FIG. 15 illustrates an example of history information used at that time. The history information illustrated in FIG. 15 is different from that illustrated in FIG. 13A in a point that elements <pageNo> 1112 and 1116 are added to the configuration of the history information illustrated in FIG. 13A. The element <pageNo> describes the page number of the page on which the image has been combined. A pageNo1 1112 describes the page number of the page of the scan document on which the image has been combined. In the example illustrated in FIG. 15, the form document 701 has been combined on the first and the third sheets of the document as illustrated in a field 1113.

Similarly, an element pageNo2 1116 describes the number of the page of the scan document on which the image has been combined. In the example illustrated in FIG. 15, the form document 901 has been combined on the second and the fourth sheets of the document as illustrated in a field 1117.

By adding the item that indicates an association between the page of the form document and the page of the scan document in the above-described manner, the present exemplary embodiment can allow the system administrator to easily identify on which page what form document has been combined even if different form documents have been combined on different pages.

As another image combination function, a function for printing the page number and the number of copies (outputs) during printing can be used. The page number and the number of copies (outputs) are not to be stored as an image log because the confidentiality of the page number and the number of copies (outputs) is low different from the case of the form document, although the page number and the number of copies are images to be combined with the document image. Information describing that the page number or the number of copies have been printed can be recorded as the history information instead of storing the same as an image log.

As described above, the log information stored on the log information storage area of the HDD 203 is periodically transmitted to the data server 103 to be stored on the data server 103.

The stored log information can be accessed from the administrator PC 104. The administrator PC 104 can access the data server 103 via the network 106 and display the log information on the display unit of the data server 103.

Figure 16:
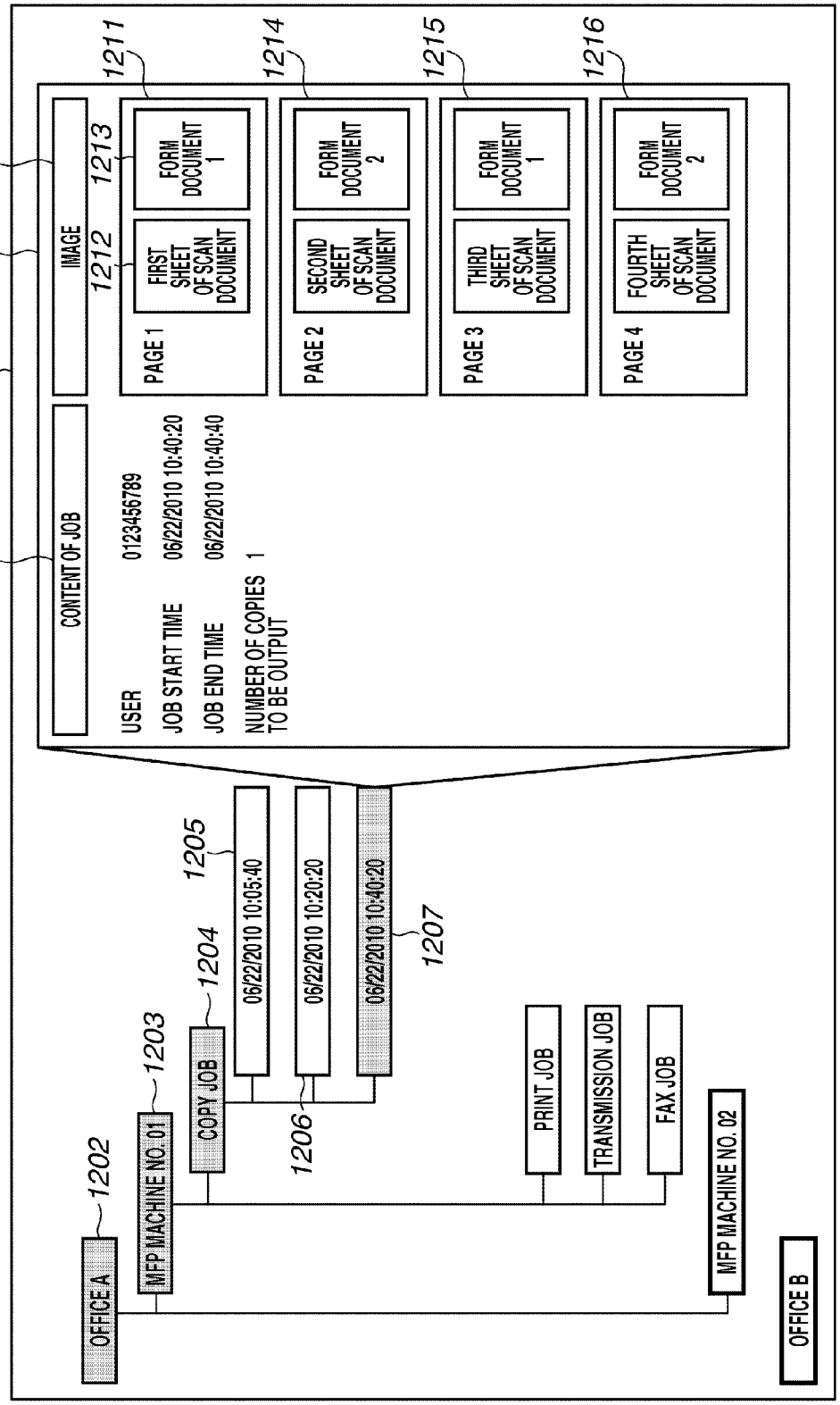
FIG. 16 illustrates an example method for viewing log information via a web application according to an exemplary embodiment of the present invention.

FIG. 16 illustrates an example display screen that displays the log information stored on the data server 103, which is displayed on a display unit of the administrator PC 104.

Referring to FIG. 16, a screen 1201 is displayed on the display unit of the administrator PC 104. The screen illustrated in FIG. 16 is displayed by the web application that has been activated and which is currently operating on the administrator PC 104.

The data server 103 manages information about the plurality of MFPs connected via the network 106. More specifically, the data server 103 manages the information about each MFP in a hierarchical structure, which includes an installation location 1202, an MFP management number 1203, and a job kind 1204 of the job executed on the MFP in this hierarchical order.

Log information 1205 through 1207 is log information about the copy job stored on the data server 103. In transmitting the log information to the data server 103, the MFP adds MFP identification information for identifying the MFP to the log information and transmits the MFP identification information to the data server 103 together with the log information.

The data server 103 associates the log information received from the MFP with the MFP identified by the MFP identification information, which has been added to the log information, and stores the mutually associated information. The log information 1205 through 1207 is stored in association with an MFP 01 (corresponding to the MFP 101).

The log information 1205 corresponds to the log information illustrated in FIG. 5. The log information 1206 corresponds to the log information illustrated in FIGS. 10A and 10B. The log information 1207 corresponds to the log information illustrated in FIGS. 14 and 15.

On the screen 1201, the log information 1207 is currently selected, and the content of the log information 1207 is displayed in a field 1208. A field 1209 displays a content of the job log, which corresponds to the example illustrated in FIG. 15. In the example illustrated in FIG. 16, the job log content field 1209 displays items, such as "user", "job start time", "job end time", and "number of outputs". A field 1210 displays a content of the image log. The image log content field 1210 displays the content corresponding to the content illustrated in FIG. 14.

Image logs 1211 through 1214 are image logs of the first through the fourth pages of the document, respectively. In the image log fields 1211 through 1214, images corresponding to each of the image logs are displayed. In the example illustrated in FIG. 16, different images that correspond to the scan document and the form document are displayed.

The data server 103 can determine that the image log displayed in the image log field 1212 is an image log corresponding to the scan document and that image logs 1213 through 1216 correspond to the form document by referring to the log information illustrated in FIGS. 9B, 12B, and 15.

Accordingly, the data server 103 can store the image data generated by combining the image of the scan document and the image of the form document together according to the received log information to display the combined image data on the administrator PC 104.

In this case, the administrator PC 104 receives the combined image data and displays the image data that has been combined into one image on the display field that displays the image 1210, as an image log for the log information 1207.

In the exemplary embodiments of the present invention described above, the CPU 201 stores document IDs of a plurality of documents that have been combined together. However, alternatively, the CPU 201 can store information about how the plurality of documents has been combined.

For example, if a scan document and a form document are to be combined together, the CPU 201 can store information about whether to combine the form document with the scan document or vice versa in addition to the information stored as described above.

In the above-described exemplary embodiments of the present invention, the image data to be combined with the form document is read by using the scanner 205 to be input. However, the present invention is not limited to this. More specifically, the image data to be combined with the form document can be received via the network I/F 207 to be input.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-238690 filed Oct. 25, 2010, which is hereby incorporated by reference herein in its entirety.

What is claimed is:

1. An image processing apparatus comprising:
at least one storage device that stores a set of instructions; and
at least one processor that executes instructions in the at least one storage device of:
inputting an image;
storing, in a memory, a plurality of form images including at least a first form image and a second form image;
synthesizing the inputted image and at least one form image stored in the memory;
printing an image obtained by the synthesizing; and
storing, in a storage, both an input log of the inputting of the image and an output log of execution of the printing,
wherein in accordance with execution of the inputting of the image, the inputted image is stored in the storage as the input log, and in accordance with execution of the printing of the image obtained by the synthesizing, reference information which is for referring to the inputted image stored in the storage and reference information which is for referring to the at least one form image used in the synthesizing are stored in the storage as the output log of the execution of the printing,
wherein, in a case where both the first form image and the second form image are used in the synthesizing, the reference information which is for referring to the inputted image which is not synthesized with a form image, reference information which is for referring to the first form image, and reference information which is for referring to the second form image are stored in association with each other as output logs of the execution of the printing in the storage.

2. A control method for controlling an image processing apparatus, the method comprising:
inputting an image;
storing, in a memory, a plurality of form images including at least a first form image and a second form image;
synthesizing the inputted image and at least one form image stored in the memory;
printing an image obtained in the synthesizing; and
storing, in a storage, both an input log of the inputting of the image and an output log of execution of the printing,
wherein in accordance with execution of the inputting of the image, the inputted image is stored in the storage as the input log, and in accordance with execution of the printing of the image obtained in the synthesizing, reference information which is for referring to the inputted image stored in the storage and reference information which is for referring to the at least one form image used in the synthesizing are stored in the storage as the output log of the execution of the printing,
wherein, in a case where both the first form image and the second form image are used in the synthesizing, the reference information which is for referring to the inputted image which is not synthesized with a form image, reference information which is for referring to the first form image, and reference information which is for referring to the second form image, are stored in the storage in association with each other as output logs of the execution of the printing in the storage.

3. The image processing apparatus according to claim 1, wherein, in a case where the inputted image includes a plurality of pages, the inputted image, the reference information which is for referring to the first form image, and the reference information which is for referring to the second form image are stored in the storage such that the reference information which is for referring to the first form image is associated with a page on which the first form image is synthesized and the reference information which is for referring to the second form image is associated with a page on which the second form image is synthesized.

4. The image processing apparatus according to claim 1, wherein an image on an original is read in the inputting.

5. The image processing apparatus according to claim 1, wherein an image is received from an external apparatus in the inputting.

6. The image processing apparatus according to claim 1, wherein the instructions further include making a connection to a network, and
wherein the storage is included in a server which is communicable with the image processing apparatus via the network.

7. The image processing apparatus according to claim 1, wherein each of the inputted image, the reference information which is for referring to the first form image, and the reference information which is for referring to the second form image is not a difference image which is generated by comparing a plurality of images.

* * * * *